US008521507B2

(12) United States Patent
Shi et al.

(10) Patent No.: US 8,521,507 B2
(45) Date of Patent: Aug. 27, 2013

(54) BOOTSTRAPPING TEXT CLASSIFIERS BY LANGUAGE ADAPTATION

(75) Inventors: Lei Shi, Beijing (CN); Mingjun Tian, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 502 days.

(21) Appl. No.: 12/864,208

(22) PCT Filed: Feb. 22, 2010

(86) PCT No.: PCT/CN2010/000225
§ 371 (c)(1),
(2), (4) Date: Jul. 22, 2010

(87) PCT Pub. No.: WO2011/100862
PCT Pub. Date: Aug. 25, 2011

(65) Prior Publication Data
US 2012/0197627 A1 Aug. 2, 2012

(51) Int. Cl.
*G06F 17/27* (2006.01)
(52) U.S. Cl.
USPC ............... 704/2; 704/3; 704/4; 704/5; 704/6; 704/7; 704/8; 704/9; 715/256; 715/264
(58) Field of Classification Search
USPC .................... 704/2–9; 715/256, 264
See application file for complete search history.

(56) References Cited

U.S. PATENT DOCUMENTS

| | | | |
|---|---|---|---|
| 6,879,956 B1 * | 4/2005 | Honda et al. ................ 704/244 |
| 7,249,012 B2 * | 7/2007 | Moore ............................ 704/4 |
| 7,340,388 B2 * | 3/2008 | Soricut et al. ................... 704/4 |
| 7,346,487 B2 * | 3/2008 | Li ................................. 704/2 |
| 7,467,079 B2 * | 12/2008 | Morimoto et al. ............... 704/9 |
| 7,783,473 B2 * | 8/2010 | Bangalore et al. ............... 704/2 |
| 7,945,437 B2 * | 5/2011 | Mount et al. .................... 704/4 |
| 2006/0069678 A1 * | 3/2006 | Chou et al. ...................... 707/5 |
| 2009/0192781 A1 | 7/2009 | Bangalore et al. |
| 2011/0098999 A1 * | 4/2011 | Amini et al. .................... 704/2 |

FOREIGN PATENT DOCUMENTS

CN 101587493 11/2009

OTHER PUBLICATIONS

Rigutini, L.; Maggini, M.; Bing Liu; , "An EM based training algorithm for cross-language text categorization," Web Intelligence, 2005. Proceedings. The 2005 IEEE/WIC/ACM International Conference on , vol., No., pp. 529-535, Sep. 19-22, 2005.*

(Continued)

*Primary Examiner* — Paras D Shah
(74) *Attorney, Agent, or Firm* — Hickman Palermo Truong Becker Bingham Wong LLP (57) ABSTRACT

Training data in one language is leveraged to develop classifiers for multiple languages under circumstances where all of those classifiers will be performing the same kind of classification task, but relative to linguistically different sets of texts, thereby saving the cost of manually labeling a different set of training data for each language. Classification knowledge is learned for a source language in which training data are available. That knowledge is transferred to another target language's classifier through the integration of language transition knowledge. The transferred model is adjusted to better fit the target language. In one technique, leveraging one language's classification knowledge in order to generate a classifiers for another language involves training a text classifier in a source language, transferring the learned classification knowledge from the source language to another target language using language translation techniques, and further tuning the transferred model to better fit the target language text.

17 Claims, 3 Drawing Sheets

(56) References Cited

OTHER PUBLICATIONS

Christof Monz and Bonnie J. Dorr. 2005. Iterative translation disambiguation for cross-language information retrieval. In Proceedings of the 28th annual international ACM SIGIR conference on Research and development in information retrieval (SIGIR '05). ACM, New York, NY, USA, 520-527.*

PCT Search Report received in International Application No. PCT/CN10/00225 dated Feb. 22, 2010 (8 pages).

Current Claims in PCT Application No. PCT/CN10/00225 dated Feb. 2010 (7 pages).

* cited by examiner

BOOTSTRAPPING TEXT CLASSIFIERS BY LANGUAGE ADAPTATION

CLAIM OF PRIORITY

The present patent application claims foreign priority to PCT International Application Number PCT/CN2010/000225, also titled "BOOTSTRAPPING TEXT CLASSIFIERS BY LANGUAGE ADAPTATION," and filed on Feb. 22, 2010, the contents of which are incorporated by reference herein.

FIELD OF THE INVENTION

The present invention relates to automatic text classification using machine-learned features and, more specifically, to a technique for classifying documents that are in one language based on a machine-learned model that has been trained with documents in another language.

BACKGROUND

Due to an increased availability of documents in digital form, text classification is now being applied in a variety of contexts, ranging from document indexing based on a controlled vocabulary, to document filtering, automated metadata generation, word sense disambiguation, and population of hierarchical catalogs of web resources. Text classification has also been widely used in most modern information retrieval systems, performing tasks like spam detection, adult content filtering, etc. Text classification is also often an important feature in a search engine's relevance ranking operations.

One key difficulty with previous text classification algorithms lies in the fact that they require a large, often prohibitive, number of labeled training examples in order to learn to classify text accurately. Labeling must often be done by a human being; this is one of the most costly and time-consuming processes involved in the development of text classifiers.

Many information systems involve a documents corpus that contains documents written in a variety of different languages. Some documents may be written in one language, while other documents may be written in other languages. Internet search engines, which discover, index, and retrieve web pages from all over the Earth, are likely to access a document corpus that contains documents written in a variety of different languages. Text classification becomes even more daunting when used in such multi-lingual environments. In such environments, when "bag of words" classification models are used, separate classifiers are typically used for each language. To develop separate classifiers for each language, separate sets of training data (one set in each language) are prepared to train separate specific classification models (one for each language) for each classifier. When a separate classification model needs to be trained for each different language, the cost and time involved in labeling each set of training data becomes many times greater than the cost and time involved in labeling a single set of training data in just one language. For many languages, training data in that language is very hard to acquire, or entirely unavailable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, training data that is written in a single language is leveraged to develop classifiers for multiple languages under circumstances where all of those classifiers will be performing the same kind of classification task, but relative to linguistically different sets of texts. This technique saves the cost of manually labeling a different set of training data for each language. This technique also maintains high classification quality.

Classifiers for multiple languages often will share a significant amount of knowledge with each other even when performing the same classification task. For example, the knowledge required to classify whether a segment of text pertains to sports or not is very similar regardless of the language in which that segment of text is written. Consequently, classification knowledge can be learned for a source language in which training data are available, and then such knowledge can be transferred to another "target" language's classifier through the integration of language transition knowledge. After such a transfer, the transferred model may be further adjusted to better fit the target language. This adjustment may be based on data from the target language.

In one embodiment of the invention, three main steps are involved in leveraging one language's classification knowledge in order to generate classifiers for multiple languages. First, a text classifier is trained in a source language. Next, the learned classification knowledge from the source language is transferred to another target language using language translation techniques. Then, the transferred model is further tuned to better fit the target language text. Each of these steps in discussed in greater detail below.

Figure 1:
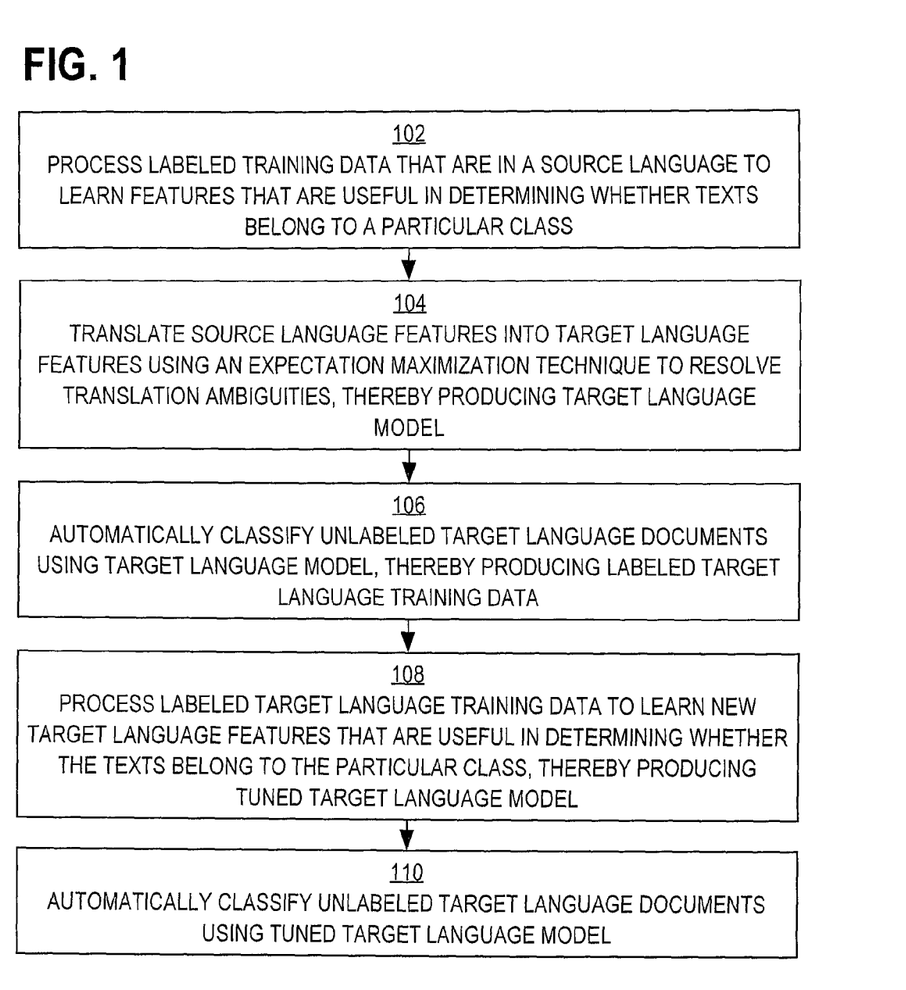
FIG. 1 is a flow diagram that illustrates a general technique for automatically generating a target language text classifier based on labeled training data in a different source language, according to an embodiment of the invention.

FIG. 1 is a flow diagram that illustrates a general technique for automatically generating a target language text classifier based on labeled training data in a different source language, according to an embodiment of the invention. Various alternative embodiment of the invention may involve additional, fewer, or different steps that those illustrated in the example of FIG. 1.

In block 102, a machine-learning mechanism processes labeled training data that are in a source language to learn features in the source language that are useful in classifying text as belonging to a particular class of a set of specified classes. The result is a source language model that indicates features in the source language.

In block 104, a translation mechanism translates the source language features into target language features, using an expectation maximum (EM) technique (described in further detail below) to resolve translation ambiguities. The result is a target language model that indicates features in the target language, but which may be biased according to a text distribution that is peculiar to the source language, thereby making the target language model "untuned."

In block 106, a target language classifier uses the "untuned" target language model to classify and label unlabelled documents in the target language. This automatically produces labeled target language training data.

In block 108, a machine-learning mechanism processes the labeled training data that are in the target language to learn new features in the target language that are useful in classifying text as belonging to the particular class of the set of specified classes. The result is a "tuned" target language model that indicates features in the target language. This "tuned" model is less likely to be biased according to a text distribution that is peculiar to the source language.

In block 110, a target language classifier uses the "tuned" target language model to classify unclassified documents in the target language. The target language classifier automatically classifies target language documents into one of several classifications, which are the same several classifications into which the source language classifier automatically classifies source language documents. Thus, classification knowledge from the source language classifier is used to generate the target language classifier despite a potential unavailability of labeled target language training data.

Bag of Words Text Classification Models

The "bag of words" model is one of the most commonly used models for text classification. The model employs a simplifying assumption by representing text as an unordered collection of words, disregarding grammar and word order from documents from which the text came. A typical bag of words model is the Naïve Bayes Classifier. In the Naïve Bayes Model, the probability that a document d belongs to a class c (where d is regarded as a bag of words ($w_1$, $w_2$, ... $w_n$)), is calculated after applying the Bayes Rule as follows:

$$P(c \mid d) = P(c \mid w_1, w_2, \ldots w_n)$$
$$= \frac{P(c)P(w_1, w_2, \ldots w_n \mid c)}{P(w_1, w_2, \ldots w_n)}$$
$$\approx \frac{P(c)\prod_{i=1}^{n} P(w_i \mid c)}{P(w_1, w_2, \ldots w_n)}$$

Then, the class c of the document d is determined by:

$$c = \operatorname{argmax}_c P(c \mid d) = \operatorname{argmax}_c P(c) \prod_{i=1}^{n} P(w_i \mid c)$$

Transferring Classification Models Across Languages Using Expectation Maximization (EM)

Given a "bag of words" model trained with training data in the source language, a straightforward approach for transferring the model's classification knowledge to another language might involve translating the "bag of words" features into a target language using a bilingual dictionary. Although such an approach would have the benefit of simplicity, a major problem with such an approach would arise due to the fact a word in the source language might have multiple possible translations in the target language. This issue is known as "translation ambiguity." Translation ambiguity causes information to be lost during the transfer process due to translation errors.

To alleviate this problem, one embodiment of the invention uses an expectation maximization (EM) technique to learn correct translations for the "bag of words" features with the maximum likelihood estimation over text in the target language. The EM technique learns the feature translation probability for a specific translation domain. With the feature probability learned, a most likely translation can be chosen for model transfer.

Given a document d in the target language, the probability P(d) of generating the document is the mixture of generating d with class c:

$$P(d) = \sum_{c} P(d \mid c)P(c)$$

Generating d given class c can be considered as two steps. First, d' is generated in a source language given c. Then, d' is translated into the target language d. In this formulation, d' is a translation of d in the source language, and is a latent variable which is not observed. Therefore:

$$P(d) = \sum_{c} \sum_{d'} P(d \mid d', c)P(d' \mid c)P(c)$$

When the documents are considered to be "bags of words," then the immediately foregoing formula can be translated into:

$$P(d) = \sum_{c} \sum_{d'} \prod_{i=1}^{n} P(w_i \mid w'_i, c)P(w'_i \mid c)P(c)$$

In the formula immediately above, $w_i$ is the $i^{th}$ word in a document d of length n, and $w'_i$ is the translation of $w_i$.

The goal of the maximum likelihood estimation is maximizing the log likelihood of the observation d with parameters θ, which are the latent variables P(w|w',c), since d' and c are not directly observed. Latent variables P(w|w',c) are the translation probabilities of translating word w' to word w given class c. Thus:

$$\overline{\theta} = \operatorname{argmax}_\theta L(\theta) = \operatorname{argmax}_\theta \sum_{i=1}^{m} \log P(d_i, \theta) =$$
$$\operatorname{argmax}_\theta \sum_{i=1}^{m} \log \left( \sum_{c} \sum_{d'} \prod_{i=1}^{n} P(w_i \mid w'_i, c)P(w'_i \mid c)P(c) \right)$$

An example of the expectation maximization (EM) algorithm is disclosed in A. P. Dempster, N. M. Laird, and D. B. Rubin, "Maximum Likelihood from Incomplete Data via the EM algorithm," *Journal of the Royal Statistical Society*, which is incorporated by reference is its entirety for all purposes as though fully set forth herein. The EM technique involves an iterative procedure to calculate parameters that maximize the log likelihood of observations $L(\theta)$. At each iteration, the parameters are computed by maximizing the expectation. The iterations stop in response to the change in the value of the parameters from the previous iteration being less than a specified threshold. The parameters at iteration t are calculated as:

$$P(w_i \mid w'_i, c)^t = \frac{\bar{\chi}(w_i, w'_i, c)}{\sum_{i=1}^{n} \bar{\chi}(w_i, w'_i, c)}$$

In the formula immediately above, $\bar{\chi}(w_i, w'_i, c)$ is the expected count of $(w_i, W'_i, c)$. The expected count of $(w_i, w'_i, c)$ is calculated as:

$$\bar{\chi}(w_i, w'_i, c) = \sum_{j=1}^{m} \sum_{c_j} \sum_{d'_j} P(c_j, d'_j \mid d_j)^{t-1} \chi(w_{ij}, w'_{ij}, c_j)$$

$$= \sum_{j=1}^{m} \sum_{c_j} \sum_{d'_j} \prod_{i=1}^{n} P(c_j, w'_{ij} \mid w_{ij})^{t-1} \chi(w_{ij}, w'_{ij}, c_j)$$

$$= \sum_{j=1}^{m} \sum_{c_j} \prod_{i=1}^{n} \sum_{k=1}^{t} P(c_j, w'_{ij} \mid w_{ij})^{t-1} \chi(w_{ij}, w'_{ij}, c_j)$$

$$= \sum_{j=1}^{m} \sum_{c_j} \prod_{i=1}^{n} \sum_{k=1}^{t} \frac{P(w_{ij} \mid w'_{ij}, c_j)^{t-1} P(w_{ij}, c_j)}{\sum_{c_j} \sum_{k} P(w_{ij} \mid w'_{ijk}, c_j)^{t-1} P(w'_{ijk}, c_j)}$$

$$\chi(w_{ij}, w'_{ij}, c_j)$$

In the formula immediately above, $\chi(w_{ij}, w'_{ij}, c_j)$ is the count of $(w_{ij}, w'_{ij}, c_j)$. The count of $(w_{ij}, w'_{ij}, c_j)$ is the number of times (or quantity of occurrences) that $w'_{ij}$ translates to $w_{ij}$ given class $c_j$. Class $c_j$ is the class of document $d_j$. Document $d_j$ is the $j^{th}$ document from the m text items that are observed in the target language. In the above notation, the superscript t−1 indicates that the parameter value qualified by t−1 is the corresponding parameter value that was calculated in the previous iteration t−1, given that the current iteration is iteration t. $P(w'_{ij}, c_j)$ is learned from the labeled training data from the source language. Transforming $$\sum_{j=1}^{m} \sum_{c_j} \sum_{d'_j} \prod_{i=1}^{n} P(c_j, w'_{ij} \mid w_{ij})^{t-1} \chi(w_{ij}, w'_{ij}, c_j)$$

into $$\sum_{j=1}^{m} \sum_{c_j} \prod_{i=1}^{n} \sum_{k=1}^{t} P(c_j, w'_{ij} \mid w_{ij})^{t-1} \chi(w_{ij}, w'_{ij}, c_j)$$

beneficially transforms the time complexity of the calculation from exponential to polynomial so that the expected count can be computed efficiently. For translating the "bag of words" feature, the translation that has the highest probability, $\bar{w} = \arg\max_w P(w \mid w'c)$, is chosen.

Figure 2:
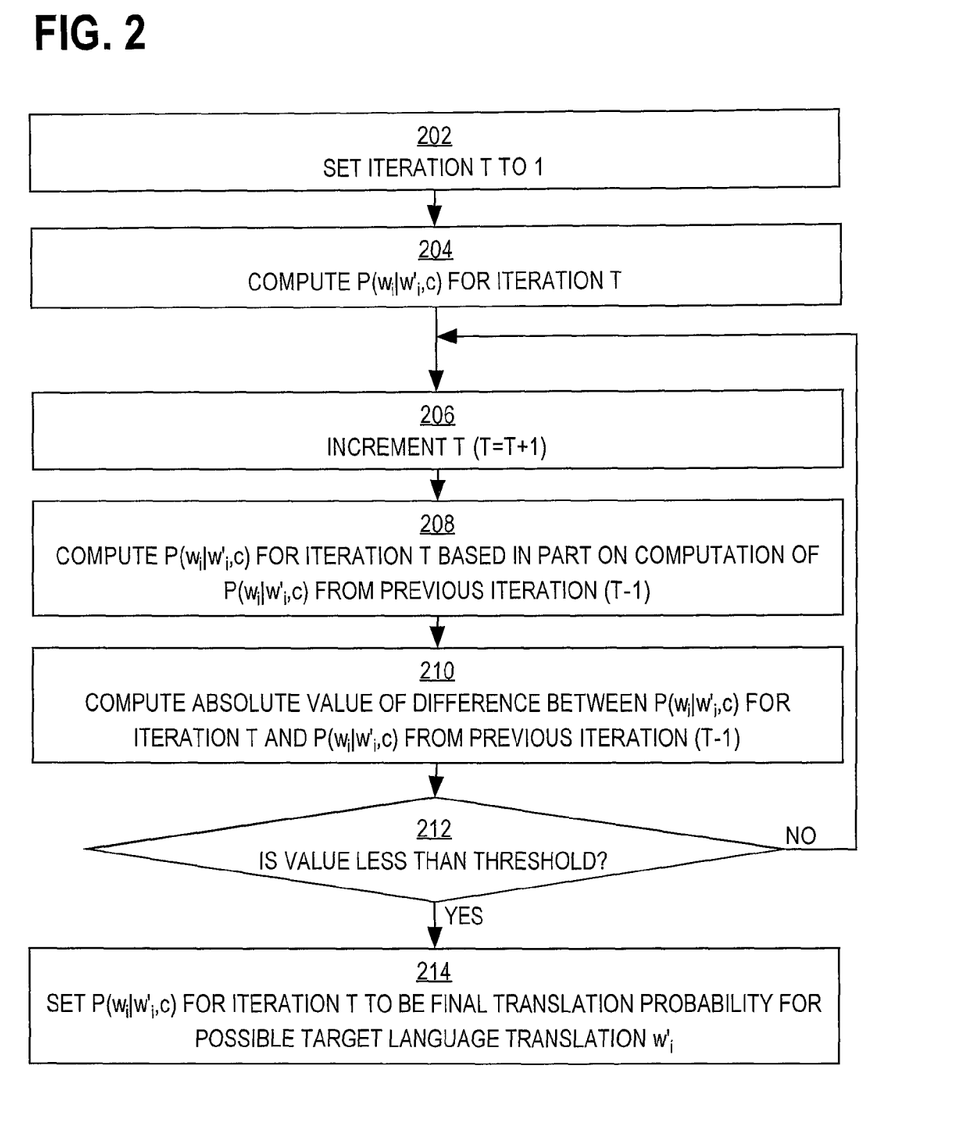
FIG. 2 is a flow diagram that illustrates a technique for automatically resolving translation ambiguities of features using an EM technique, according to an embodiment of the invention.

FIG. 2 is a flow diagram that illustrates a technique for automatically resolving translation ambiguities of features using an EM technique, according to an embodiment of the invention. The technique may be performed separately for each word in a "bag of words" set of features that has multiple possible translations. In the following discussion, $w_i$ is the $i^{th}$ word in such a set of features in the source language, $w'_i$ is one of the possible translations of that word in the target language, and c is the class (e.g., sport). Therefore, the following technique may be performed separately for each possible target language translation $w'_i$ of a particular word $w_i$ to determine the best translation. Various alternative embodiment of the invention may involve additional, fewer, or different steps that those illustrated in the example of FIG. 2.

In block 202, iteration t is set to 1. In block 204, $P(w_i \mid w'_i, c)$ is computed for iteration t. Formulas for computing $P(w_i \mid w'_i, c)$ are discussed above. In block 206, t is incremented by one (t=t+1). In block 208, $P(w_i \mid w'_i, c)$ is computed for iteration t. As can be seen from the formulas above, in one embodiment of the invention, the value of $P(w_i \mid w'_i, c)$ for the current iteration t is based at least in part on $P(w_i \mid w'_i, c)$ from the previous iteration t−1. In block 210, the absolute value of the difference between (a) $P(w_i \mid w'_i, c)$ for iteration t and (b) $P(w_i \mid w'_i, c)$ for iteration t−1 is computed. In block 212, a determination is made as to whether the absolute value is less than a specified threshold. If the absolute value is less than the specified threshold, then control passes to block 214. Otherwise, control passes back to block 206.

In block 214, $P(w_i \mid w'_i, c)$ for iteration t becomes the final translation probability for possible target language translation $w'_i$. In one embodiment of the invention, after a separate final translation probability for each possible target language translation of $w'_i$ has been determined in the manner discussed above, the target language translation that is associated with the largest final translation probability is selected to be the actual target language translation, and feature $w_i$ in the source language model is translated into that actual target language translation in the target language model.

Tuning the Transferred Model with Semi-Supervised Learning

Even though classifiers for different languages share a significant amount of knowledge when performing the same kind of classification task (e.g., determining whether a particular document pertains to sports), there may still be differences in text distribution from language to language. For example, when classifying text as being either a sports text or a non-sports text, a classifier trained from American English training data might learn that words such as "baseball" and "American football" are important features, since such terms frequently occur in American English texts that are about sports. When a significant quantity of English documents that have been labeled "sports" in the English training data contain words and phrases such as "baseball" and "American football," the machine-learning mechanism consequently determines that these words and phrases are features of the "sports" classification, at least in the English classification model. However, if the same classification model is applied to a Chinese text to determine whether that text is a sports or non-sports text, a sport text might accidentally be classified as a non-sport text due because sports such as baseball and American football are not popular in China, and are unlikely to be discussed in Chinese sports texts. Thus, automatically classifying a Chinese text as being either a sport text or a non-sport text based on whether that Chinese text contains the (correctly chosen) Chinese translations of "baseball" and/or "American football" might not be likely to classify the Chinese text correctly. Chinese sport texts are more likely to contain the Chinese words for ping-pong and soccer, since these sports are more popular in China and more likely to be discussed in Chinese texts that are about sports. However, the classification model trained based on the English training data might be unlikely to associate "ping pong" with the "sports" classification, because the English texts labeled as being "sports" texts in the training data might have had very few or no mentions of ping-pong due to the relative lesser popularity of ping-pong in English-speaking regions. The classifier trained with data from the source language might be biased to the text distribution in the source language, and might not fit as well in the target language, even after being correctly translated using the EM technique discussed above.

Therefore, in one embodiment of the invention, during a semi-supervised learning phase, the transferred (translated) classifier learns new information from a collection of unlabeled data in the target language. Because this phase only required unlabeled data, which in many cases will be plentiful and cheaply obtained, this phase may be characterized as being semi-supervised or "bootstrapped" as opposed to being fully supervised, as would be the case if the data from the target language had to be labeled (which, under this approach, it does not). The semi-supervised bootstrapping tuning technique discussed herein uses existing knowledge to collect new knowledge. For example, as is discussed above, certain words and phrases from a source language, such as "baseball," might not be reliable features when classifying a target document as being a sports document or a non-sports document due to the infrequency of those phrases in the target language data. However, words and phrases such as "Olympics" and "swimming" still might be features that are helpful in the classification of Chinese documents as being sport or non-sport because both English and Chinese documents which pertain to sports might contain these words or phrases.

Therefore, in one embodiment of the invention, the transferred (translated) classifier is applied to unlabelled texts in the target language, thereby classifying those documents. For example, a Chinese language classifier, which has been produced by training an English language classifier using labeled English training data and then translating the resulting English model's features into Chinese using the EM technique discussed above, may be applied to a subset of unlabelled Chinese documents in order to classify those documents as being either sports or non-sports documents. The application of the "untuned" target language classifier to the subset of target language documents produces automatically labeled (but potentially source language-biased) training data in the target language. This target language training data is then used to train a new, "tuned" target language classifier. As a machine-learning mechanism processes the target language training data, the machine-learning mechanism may learn new features from the target language training data that were not learned from the source language training data. For example, in processing Chinese language training data that has been automatically labeled using the technique described above, the machine-learning mechanism may determine that the Chinese words for "soccer" and "ping-pong" are important features to consider when determining whether to classify a document as being a sports or non-sports document; these words were not features that were previously learned during the training of the English language classifier.

As a result of the foregoing tuning approach, a new, "tuned" target language classifier is produced, and without the involvement of human beings in labeling any texts in the target language. The new target language classifier can then be applied to a larger set of unlabeled target language documents in order to automatically classify those target language documents (e.g., as being sports or non-sports documents). Thus, classification knowledge learned from the source language is used to "bootstrap" a classifier in the target language, for which labeled training data may be sparse or completely unavailable.

After documents in the target language have been automatically classified by the new target language classifier, the classification to which each such document belongs may be used in a variety of ways. For example, the classifier might classify a document as being spam or not spam, in which case a search engine might demote, in presentation rankings, documents that have been classified as being spam. For another example, the classifier might classify a document as being adult or not adult, in which case a search engine might at least initially prevent adult documents from being presented in search results until receiving an verification from a user that the user is of a mature age. For another example, the classifier might place the document in any of a variety of search categories, and promote the document within presentation rankings under circumstances in which the user has specifically requested that a search be performed on a sub-corpus that corresponds to the category to which the document belongs (e.g., sports, travel, shopping, news, local, etc.).

Hardware Overview

Figure 3:
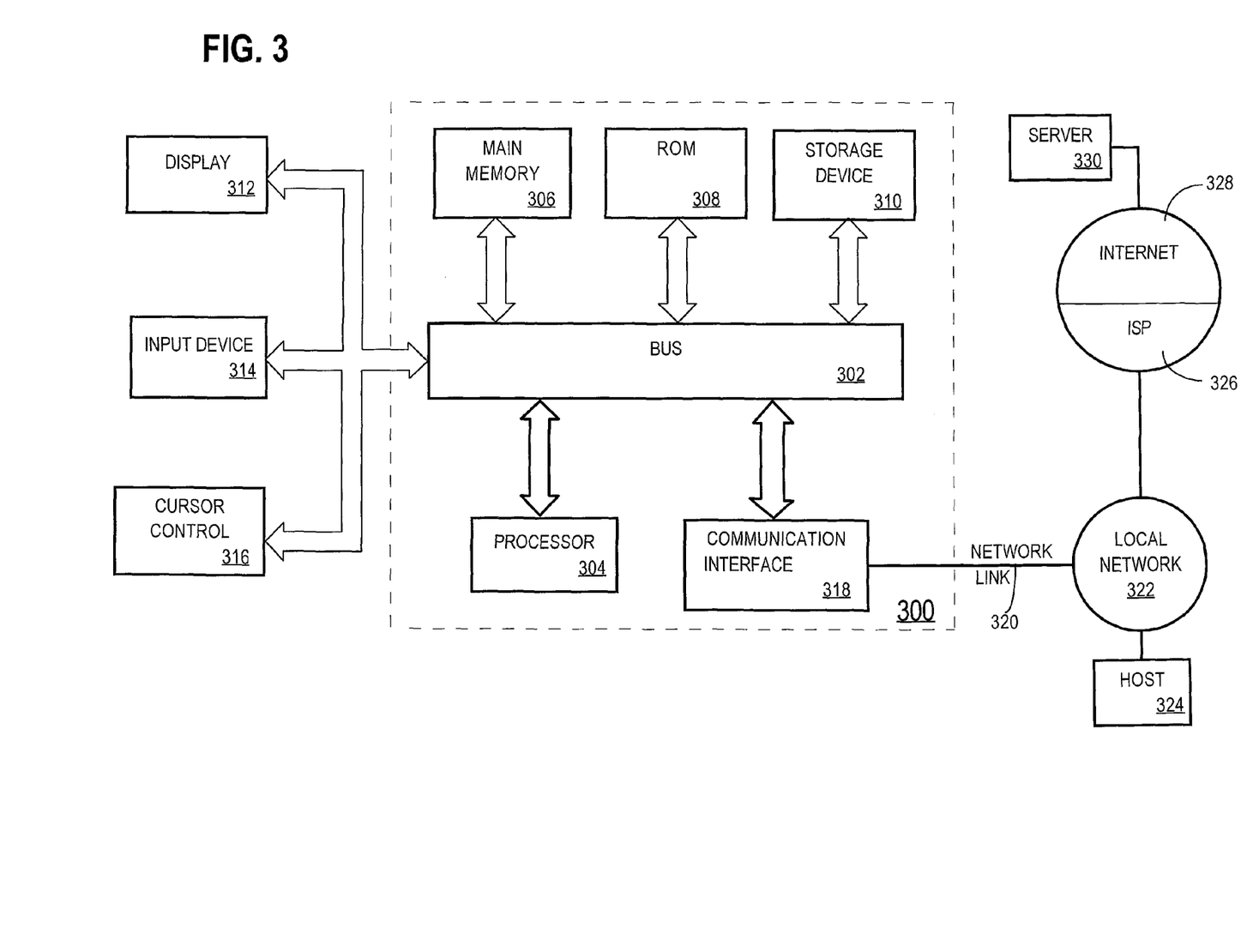
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:

training a source language text classifier based on labeled training data that is composed in the source language, thereby producing a source language model;

translating source language features from the source language model into a target language, thereby producing a target language model; and applying a target language classifier, which uses the target language model, to a particular document that is composed in the target language, thereby determining whether the particular document belongs to a particular class;

wherein the source language classifier determines, based on said training, whether documents composed in the source language belong to the particular class;

wherein translating the source language features comprises automatically selecting, for a particular source language feature of the source language features, a particular target language translation of a plurality of possible target language translations of the particular source language feature;

wherein selecting the particular target language translation is based at least in part on an expectation maximum;

wherein selecting the particular target language translation based at least in part on the expectation maximum comprises:

determining a first probability based at least in part on the particular target language translation during a first iteration;

determining a second probability based at least in part on the particular target language translation during a second iteration;

determining whether a difference between the first probability and the second probability is less than a specified threshold;

in response to determining that the difference between the first probability and the second probability is less than the specified threshold, setting a final translation probability for the particular target language translation equal to the second probability; and selecting the particular target language translation based at least in part on the final translation probability; and wherein said steps are performed by one or more computing devices.

2. The method of claim 1, further comprising:

applying the target language classifier to a set of unlabelled documents that are composed in the target language, thereby producing a set of automatically labeled target language documents;

training a new target language text classifier based on the set of automatically labeled target language documents, thereby producing a tuned target language model; and applying a new target language classifier, which uses the tuned target language model, to the particular document that is composed in the target language, thereby determining whether the particular document belongs to the particular class.

3. The method of claim 1, wherein selecting the particular target language translation based at least in part on the expectation maximum comprises selecting the particular target language translation based at least in part on a ratio of (a) an expected count for the particular target language translation to (b) a sum of expected counts of each word that also occurs in a target language document in which the particular target language translation occurs.

4. The method of claim 1, wherein selecting the particular target language translation based at least in part on the expectation maximum comprises selecting the particular target language translation based at least in part on a number of times in a particular set of target language documents that the particular target language translation translates into the particular source language feature under circumstances in which documents in the particular set of target language documents belong to the particular class.

5. The method of claim 1, wherein selecting the particular target language translation based at least in part on the expectation maximum comprises determining a set of parameters that maximize a log likelihood of observations.

6. The method of claim 5, wherein determining the set of parameters that maximize the log likelihood of observations comprises computing the parameters at each iteration of a plurality of iterations by maximizing an expectation.

7. The method of claim 1, wherein selecting the particular target language translation based at least in part on the expectation maximum comprises multiplying together a set of products, wherein the set of products comprises a separate product for each word in the particular document, wherein each separate product is determined based at least in part on a probability determined during a previous iteration of an algorithm.

8. A non-transitory computer-readable storage that stores instructions which, when executed by one or more processors, cause the one of more processors to perform the steps of:

training a source language text classifier based on labeled training data that is composed in the source language, thereby producing a source language model;

translating source language features from the source language model into a target language, thereby producing a target language model; and applying a target language classifier, which uses the target language model, to a particular document that is composed in the target language, thereby determining whether the particular document belongs to a particular class;

wherein the source language classifier determines, based on said training, whether documents composed in the source language belong to the particular class;

wherein translating the source language features comprises automatically selecting, for a particular source language feature of the source language features, a particular target language translation of a plurality of possible target language translations of the particular source language feature; and wherein selecting the particular target language translation is based at least in part on an expectation maximum;

wherein selecting the particular target language translation based at least in part on the expectation maximum comprises:

determining a first probability based at least in part on the particular target language translation during a first iteration;

determining a second probability based at least in part on the particular target language translation during a second iteration;

determining whether a difference between the first probability and the second probability is less than a specified threshold;

in response to determining that the difference between the first probability and the second probability is less than the specified threshold, setting a final translation probability for the particular target language translation equal to the second probability; and selecting the particular target language translation based at least in part on the final translation probability.

9. The non-transitory computer-readable storage of claim 8, wherein the steps further comprise:

applying the target language classifier to a set of unlabelled documents that are composed in the target language, thereby producing a set of automatically labeled target language documents;

training a new target language text classifier based on the set of automatically labeled target language documents, thereby producing a tuned target language model; and applying a new target language classifier, which uses the tuned target language model, to the particular document that is composed in the target language, thereby determining whether the particular document belongs to the particular class.

10. The non-transitory computer-readable storage of claim 8, wherein selecting the particular target language translation based at least in part on the expectation maximum comprises selecting the particular target language translation based at least in part on a ratio of (a) an expected count for the particular target language translation to (b) a sum of expected counts of each word that also occurs in a target language document in which the particular target language translation occurs.

11. The non-transitory computer-readable storage of claim 8, wherein selecting the particular target language translation based at least in part on the expectation maximum comprises selecting the particular target language translation based at least in part on a number of times in a particular set of target language documents that the particular target language translation translates into the particular source language feature under circumstances in which documents in the particular set of target language documents belong to the particular class.

12. The non-transitory computer-readable storage of claim 8, wherein selecting the particular target language translation based at least in part on the expectation maximum comprises determining a set of parameters that maximize a log likelihood of observations.

13. An apparatus comprising:
  a storage that stores at least labeled training data that is composed in a source language;
  a storage that stores at least a particular document that is composed in a target language that differs from the source language;
  one or more processors that:
    (a) train a source language text classifier based on the labeled training data, thereby producing a source language model;
    (b) translate source language features from the source language model into a target language at least in part by selecting, for at least a particular source language feature of the source language features, and based at least in part on an expectation maximum, a particular target language translation of a plurality of possible target language translations of the particular source language feature; and
    (c) apply a target language classifier, which uses a target language model produced based at least in part on the selecting, to the particular document, thereby determining whether the particular document belongs to a particular class;
  wherein the one or more processors select the particular target language translation at least in part by:
    determining a first probability based at least in part on the particular target language translation during a first iteration;
    determining a second probability based at least in part on the particular target language translation during a second iteration;
    determining whether a difference between the first probability and the second probability is less than a specified threshold;
    in response to determining that the difference between the first probability and the second probability is less than the specified threshold, setting a final translation probability for the particular target language translation equal to the second probability; and
    selecting the particular target language translation based at least in part on the final translation probability.

14. The apparatus of claim 13, wherein the one or more processors further:
  apply the target language classifier to a set of unlabelled documents that are composed in the target language, thereby producing a set of automatically labeled target language documents;
  train a new target language text classifier based on the set of automatically labeled target language documents, thereby producing a tuned target language model; and
  apply a new target language classifier, which uses the tuned target language model, to the particular document that is composed in the target language, thereby determining whether the particular document belongs to the particular class.

15. The apparatus of claim 13, wherein the one or more processors select the particular target language translation based at least in part on a ratio of (a) an expected count for the particular target language translation to (b) a sum of expected counts of each word that also occurs in a target language document in which the particular target language translation occurs.

16. The apparatus of claim 13, wherein the one or more processors select the particular target language translation based at least in part on a number of times in a particular set of target language documents that the particular target language translation translates into the particular source language feature.

17. The apparatus of claim 13, wherein the one or more processors select the particular target language translation at least in part by determining a set of parameters that maximize a log likelihood of observations.

* * * * *